US011373141B2

(12) United States Patent
DeLuca et al.

(10) Patent No.: US 11,373,141 B2
(45) Date of Patent: Jun. 28, 2022

(54) DYNAMIC INVENTORY ESTIMATION

(71) Applicant: International Business Machines Corporation, Armonk, NY (US)

(72) Inventors: Lisa Seacat DeLuca, Baltimore, MD (US); Jeremy R. Fox, Georgetown, TX (US); Zachary A. Silverstein, Jacksonville, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/022,362

(22) Filed: Sep. 16, 2020

(65) Prior Publication Data
US 2022/0083955 A1 Mar. 17, 2022

(51) Int. Cl.
*G06Q 10/08* (2012.01)
*G06Q 20/20* (2012.01)

(52) U.S. Cl.
CPC ......... *G06Q 10/087* (2013.01); *G06Q 20/203* (2013.01)

(58) Field of Classification Search
CPC ................ G06Q 10/087; G06Q 20/203
See application file for complete search history.

(56) References Cited

U.S. PATENT DOCUMENTS

| 9,747,632 | B2 | 8/2017 | Hicks et al. |
| 10,430,756 | B2 | 10/2019 | Greenberg |
| 10,453,047 | B2 | 10/2019 | Hicks et al. |
| 10,586,204 | B2 | 3/2020 | Li et al. |
| 2001/0047293 | A1 | 11/2001 | Waller et al. |
| 2001/0049690 | A1* | 12/2001 | McConnell ............... G07G 1/14 |
| 2002/0147651 | A1* | 10/2002 | Hoar .................. G06Q 30/0601 705/26.1 |
| 2007/0016496 | A1* | 1/2007 | Bar ...................... G06Q 10/087 705/28 |
| 2013/0166415 | A1* | 6/2013 | Odenheimer .......... G06Q 30/06 705/26.62 |
| 2015/0066570 | A1* | 3/2015 | Hellen ............. G06Q 10/06315 705/7.25 |
| 2015/0324779 | A1* | 11/2015 | Gala .................... G06Q 20/203 705/22 |

(Continued)

FOREIGN PATENT DOCUMENTS

| AU | 2017301537 A1 | 12/2018 |
| CN | 104603850 B | 8/2016 |

(Continued)

OTHER PUBLICATIONS

Melanie, "Using Machine Learning in Inventory Management", May 31, 2018, 6 pages.

(Continued)

*Primary Examiner* — Florian M Zeender
*Assistant Examiner* — Vanessa Deligi
(74) *Attorney, Agent, or Firm* — James L. Olsen

(57) ABSTRACT

A first sale frequency can be determined based on a first number of product sales of a first product over a first time period. A second sale frequency can be determined based on a second number of product sales of the first product over a second time period. The first and second sale frequencies can then be compared to estimate availability of the first product. The estimated availability can then be presented to a user.

9 Claims, 6 Drawing Sheets

(56) References Cited

U.S. PATENT DOCUMENTS

| | | | |
|---|---|---|---|
| 2016/0371613 A1* | 12/2016 | Ulrich | G06Q 10/087 |
| 2018/0165627 A1 | 6/2018 | Jones et al. | |
| 2018/0285902 A1* | 10/2018 | Nazarian | G06Q 10/087 |
| 2019/0139060 A1 | 5/2019 | Ferdowski et al. | |
| 2020/0019754 A1 | 1/2020 | Adato et al. | |
| 2020/0074391 A1 | 3/2020 | Adato et al. | |
| 2020/0219042 A1* | 7/2020 | Gaurav | G06Q 10/087 |

FOREIGN PATENT DOCUMENTS

| | | |
|---|---|---|
| WO | 2018022264 A1 | 2/2018 |
| WO | 2019246628 A1 | 12/2019 |

OTHER PUBLICATIONS

Arun, V., "Stockout Prediction using machine learning", Feb. 25, 2018, 9 pages.

Mell et al., "The NIST Definition of Cloud Computing", Recommendations of the National Institute of Standards and Technology, Sep. 2011, 7 pages.

* cited by examiner

DYNAMIC INVENTORY ESTIMATION

BACKGROUND

The present disclosure relates generally to the field of inventory management, and in particular, to dynamic inventory estimation.

Inventory management techniques are used by businesses to make determinations regarding the placement and order of products. The scope of inventory management covers replenishment, carrying costs, asset management, inventory forecasting, inventory valuation, inventory visibility, future inventory price forecasting, available physical space, quality management, returns and defective goods, and demand forecasting. Businesses attempt to balance these requirements to attain optimal inventory levels.

SUMMARY

Embodiments of the present disclosure relate to a method, system, and computer program product for estimating the availability of products. A first sale frequency can be determined based on a first number of product sales of a first product over a first time period. A second sale frequency can be determined based on a second number of product sales of the first product over a second time period. The first and second sale frequencies can then be compared to estimate availability of the first product. The estimated availability can then be presented to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
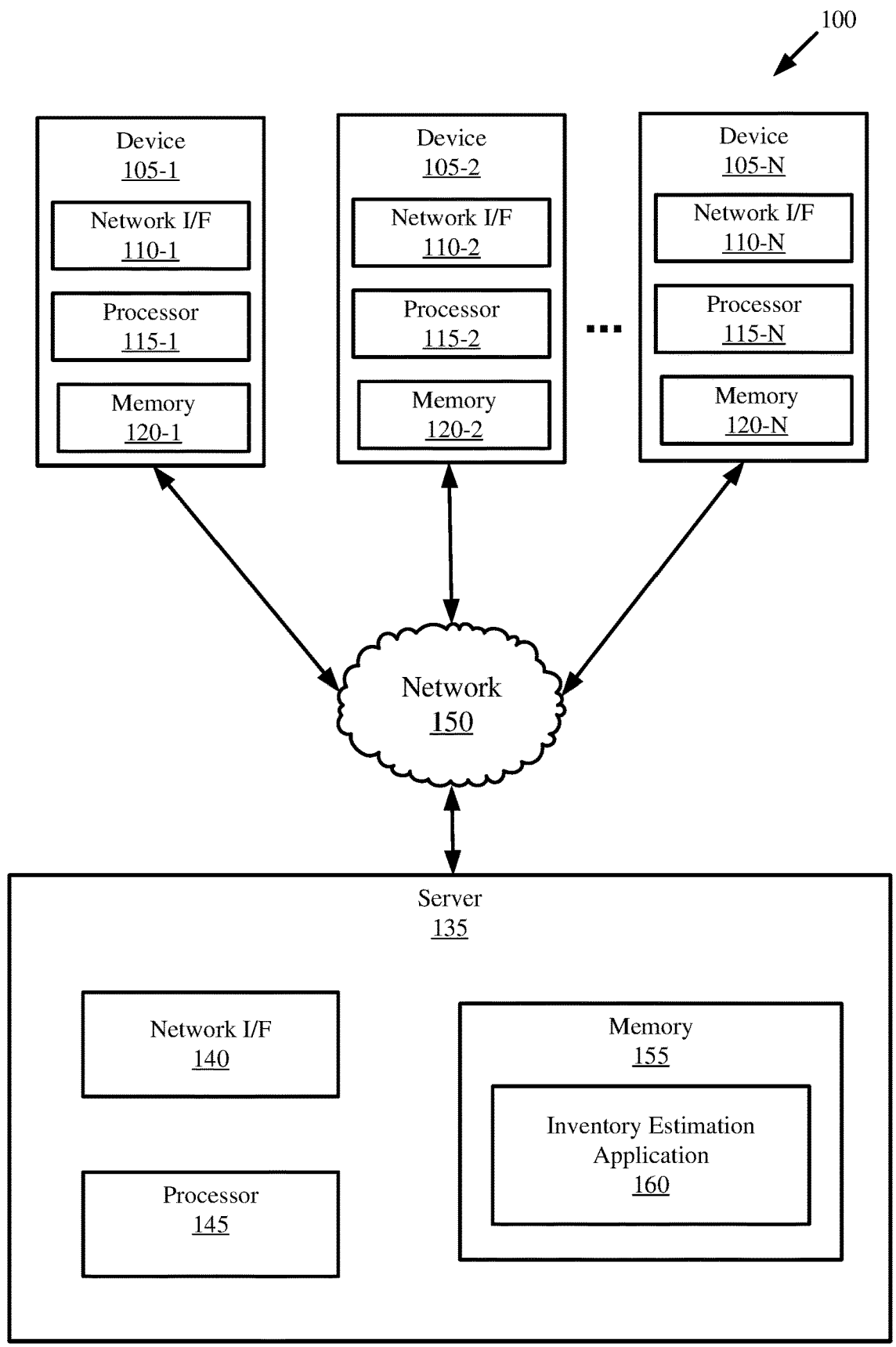
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of inventory management, and in particular, to dynamic inventory estimation. While the present disclosure is not necessarily limited to such applications, various aspects of the disclosure can be appreciated through a discussion of various examples using this context.

A growing number of customers are relying on inventory counts displayed on applications and websites of merchants (e.g., retailers) when deciding whether to travel to a store to purchase a given product. However, frequently, these inventory counts are not updated rapidly enough (e.g., on a batch basis such as every hour, day, etc.), and upon a customer's arrival, the inventory is already depleted. This problem is exacerbated during crises in which many customers are attempting to stockpile a given product. For example, during the initial phase of the COVID-19 pandemic, in many countries it became increasingly difficult to track and purchase certain hygiene products such as paper towel, toilet paper, disinfectant, and soap. This only amplifies the complications of any given crisis (e.g., pandemics, wildfires, geopolitical unrest, hurricanes, etc.), as it may be disadvantageous for customers to take unnecessary trips to stores for products that are not in stock, therein, e.g., increasing the possibility for spread of the virus, creating unnecessary traffic, or the like.

Aspects of the present disclosure address the aforementioned complications by providing inventory estimates to users based on sale frequency changes over time. A first sale frequency can be determined based on a first number of product sales of a first product over a first time period. A second sale frequency can be determined based on a second number of product sales of the first product over a second time period. The first and second sale frequencies can then be compared to estimate availability of the first product. The estimated availability can then be presented to a user. By providing availability estimates to users based on sale frequency, actual inventory count is not required, which may be slow to update or inaccurate. Further still, availability estimates based on sale frequency provide further assurance to merchants and users regarding whether or not particular products are in stock.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, financial transaction terminals, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 5.

The server 135 includes an inventory estimation application 160. The inventory estimation application 160 can be configured to estimate product availability (e.g., an estimated current inventory) of a product (or class of similar products). The inventory estimation application 160 can be configured to determine a first sale frequency of a product based on a first number of product sales over a first time period. The inventory estimation can then be configured to determine (at a future time) a second sale frequency of the product based on a second number of product sales over a second time period. The first and second sale frequencies can then be compared to estimate availability of the product. The estimated availability can then be presented to a user. For example, the estimated availability can be presented to the user via a display of a respective device 105 by, e.g., providing a respective graphical element on a user interface related to purchasing the product. In embodiments, if the second sale frequency is significantly lower (e.g., based on a threshold value) than the first sale frequency, a determination can be made that the product is out of stock (or low inventory). In embodiments, if the second sale frequency is not significantly lower than the first sale frequency, a determination can be made that the product is in stock.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
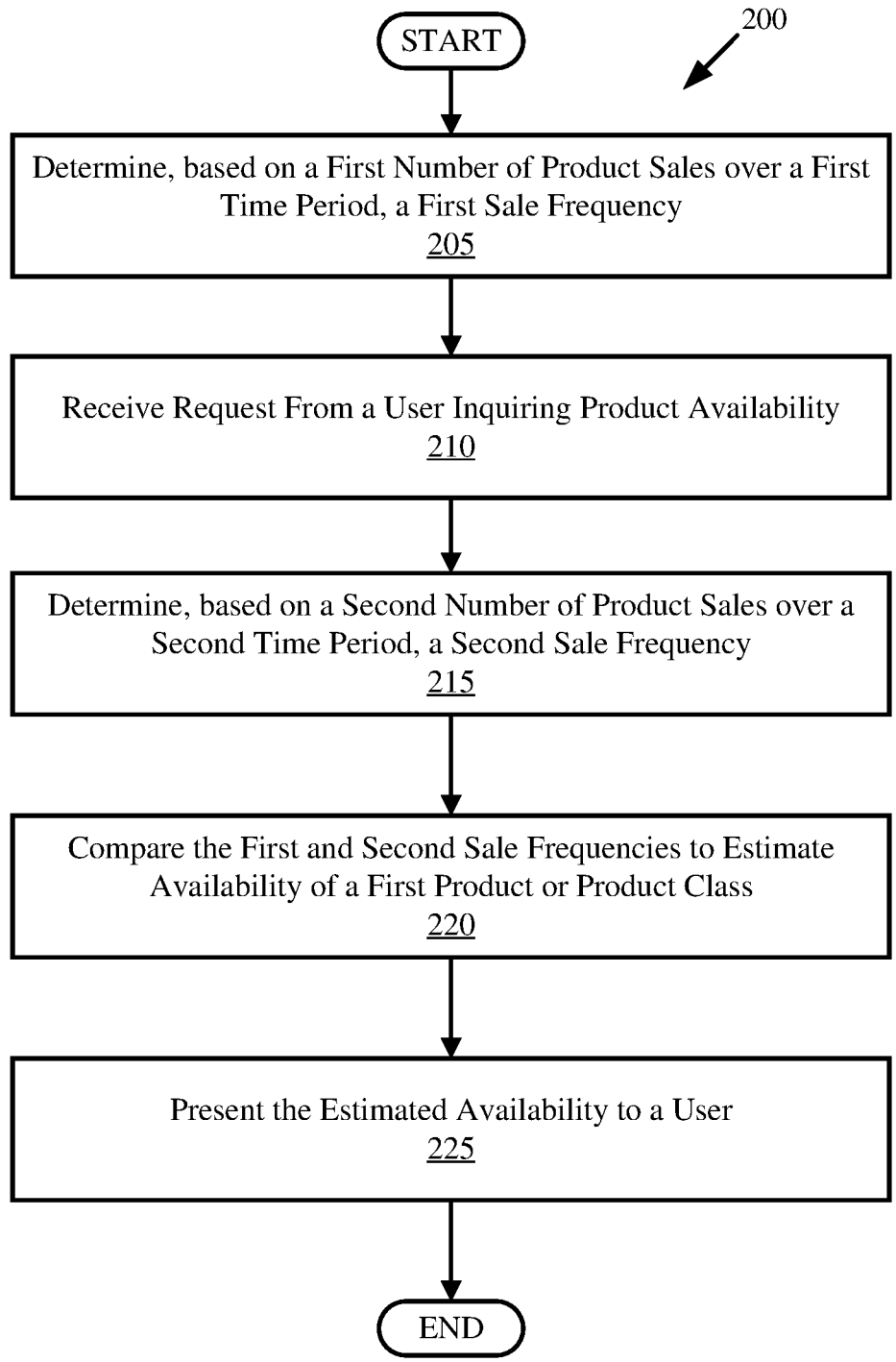
FIG. 2 is a flow-diagram illustrating an example method for estimating product availability, in accordance with embodiments of the present disclosure.

Referring now to FIG. 2, shown is a flow-diagram of an example method 200 for estimating availability of a product and presenting the estimation to a user, in accordance with embodiments of the present disclosure. One or more operations in method 200 can be completed by one or more computing devices (e.g., devices 105 and server 135).

Method 200 initiates at operation 205, where a first sale frequency is determined based on a first number of product sales over a first time period. The first sale frequency can be determined to establish a baseline indicating the rate that a particular product or class of products is being sold. This baseline can then be used for comparison to sale frequencies at future time periods such that inventory counts can be approximated (e.g., by comparing future sale frequencies to the baseline, to be discussed with respect to operation 215). In embodiments, sale frequencies are calculated based on a number of product sales over a particular time period. For example, sale frequencies can be calculated based on a number of product sales over a 5 minute interval, 30 minute interval, 1 hour interval, 1 day interval, etc. As an example, if 5 products are sold every 5 minutes, the sale frequency would be calculated as 1 product per minute. As another example, if 120 products are sold every hour, the sale frequency would be calculated as 2 products per minute.

In embodiments, the first sale frequency can be calculated over a relatively long time period such that a reliable baseline is established for sales of a given product. For example, in embodiments, the first sale frequency can be calculated over a one week, one month, one year, etc. period such that the first sale frequency is generally a non-static representation of typical sales of the product or class of products. In embodiments, the first sale frequency can be represented by a statistical distribution having a mean value and corresponding standard deviations. Thus, multiple sale frequencies can be calculated over various time periods and a distribution can be generated using the multiple sale frequencies, with the mean value equating to the first sale frequency. In embodiments, the first sale frequency can be calculated based on sales originated from a single location or multiple locations. For example, the first sale frequency can be calculated for a first product sold at a single store or a plurality of stores distributed across the nation/globe.

In embodiments, without limitation, product sales can be determined using product identifiers such as stock keeping units (SKU). In these embodiments, each purchase associated with a given SKU or other identifier can be considered a sale. In this manner, sales can be tracked using bar code scanners, radio-frequency identification (RFID) scanners, by using image recognition (e.g., to identify an SKU for a given product in an online shopping cart), or using computer instructions (e.g., code facilitating an online sale). However, other identifiers such as quick response (QR) codes and uniform resource locators (URLs) can be used to track the sale of products (by scanning the QR code or URL at the time of purchase).

In embodiments, rather than determining product sales of individual products, product sales of product categories (e.g., classes) can be determined. This may be helpful when a customer does not have a preference for a particular product within a given class (e.g., based on brand, quantity, cost, or quality). For example, SKU's of related products can be grouped together into a product class and the sales of the product class can be tracked using the SKU's (e.g., based on barcode scans). Thus, the sale frequency can be determined for the class of products, rather than individual products, to be used to estimate the current inventory or availability of the class of products.

A request is received from a user inquiring product availability of the product or class of products. This is illustrated at operation 210. The request can be received in response to the user's interest in a specific product or type of product. For example, upon selecting the product on a webpage, mobile application, etc., the user can select a graphical user interface (GUI) option indicating their interest in the availability of the product or product class.

A second sale frequency is then determined based on a second number of product sales over a second time period. This is illustrated at operation 215. Thus, at a future time, a second sale frequency can be determined such that it can be compared to the baseline (the first sale frequency) determined at operation 205. The second sale frequency can be determined over the same, or alternatively, a different time period as in operation 205. For example, the first sale frequency can be determined over an hour time period while the second sale frequency can be determined over a 5 minute time period.

Further, the second sale frequency can be collected any suitable time subsequent to the determination of the first sale frequency. In some embodiments, the second sale frequency can be determined in response to the user request at operation 210. In some embodiments, the second sale frequency can be determined directly after the first sale frequency. For example, if the first sale frequency is determined over the time period 9:00 AM to 10:00 AM, the second sale frequency could be determined over the time period 10:00 AM to 11:00 AM. However, the second sale frequency can be determined any suitable time (e.g., 10 minutes, 1 hour, 1 day, etc.) after the determination of the first sale frequency.

The first and second sale frequencies are then compared to estimate availability (e.g., whether or not the product is in stock, whether the product is predicted to be high in stock or low in stock) of the product or product class. This is illustrated at operation 220. In embodiments, the comparison can include determining whether the second sale frequency significantly differs from the first sale frequency (e.g., based on a threshold value). For example, in some embodiments, if the second sale frequency falls below the first sale frequency by a threshold amount, a determination can be made that the product or product class is out of stock. This example is depicted in method 300 of FIG. 3. This can be helpful as if the sale frequency has decreased by a particular amount over time, it may be indicative that the product or product class is out of stock.

In some embodiments, if the second sale frequency is zero and the first sale frequency is non-zero, a determination can be made that the product or class of products is out of stock. This determination can be made because if no products are sold over the second time period, but products are sold over the first time period, this can indicate the product or class of products is out of stock. In some embodiments, a threshold time period since a last sale can be considered when determining whether the product is in stock. For example, if a threshold time period has passed and there have been no sales of the product or class of products, then this can weigh in favor of determining that the product or class of products are out of stock.

In some embodiments, the second sale frequency being greater than or equal to the first sale frequency can be indicative that the product or class of products is in stock. This is because if the product is selling at the same, or a greater rate, in the future, the product is likely still available for purchase. For example, if the first sale frequency is 10 sales per hour and the second sale frequency is 10 sales per hour, then a determination can be made that the product or class of products is in stock.

However, in some embodiments, if the second sale frequency exceeds the first sale frequency by a threshold amount, a determination can be made that the product or class of products has low availability or is out of stock. This is because if the second sale frequency significantly spikes, it may be indicative that the available stock is depleting/depleted. For example, assume a first sale frequency is calculated as 100 sales/day on a first day and a second sale frequency is calculated as 1000 sales/day on a second day. Further assume that a threshold dictating estimated availability defines that if the second sale frequency is 500 sales/day greater than the first sale frequency, a determination can be made that the product is out of stock. In this example, because the second sale frequency exceeds the first sale frequency by more than 500 units/day, a determination can be made that the product is out of stock.

In some embodiments, if the second sale frequency is within a threshold range (e.g., a lower and upper limit) of the first sale frequency, a determination can be made that the product or class of products is in stock. As an example, if a first sale frequency is 10 sales/hour and a threshold range dictating product availability is defined as plus or minus 5 sales/hour, then if the second sale frequency is between 5-15 sales/hour, a determination can be made that the product is in stock. This can be implemented as if the second sale frequency does not significantly differ from the first sale frequency, the product may be considered to be in stock.

In some embodiments, though not shown in FIG. 2, past sale frequencies (e.g., a history of sale frequencies calculated over different time periods in the past) of a product or product class can be collected and a distribution (e.g., a bell curve) can be generated based on the past sale frequency values. Further, a mean value and standard deviation values for the distribution can be calculated. In this example, the placement of the second sale frequency within the distribution can be used to estimate availability. For example, if the second sale frequency is a particular percentile or number of standard deviations away from the mean, a determination can be made that the product or class of products is out of stock. Similarly, if the second sale frequency is within a particular percentile or number of standard deviations away from the mean value of the past sale frequencies, then a determination can be made that the product or class of products is in stock.

In some embodiments, availability classifications coupled to threshold values can be used to provide availability estimates to users based on the comparison. For example, assume four classifications exist for a given product or class of products: high stock, in stock, low stock, and out of stock. Assume that thresholds for each corresponding classification are as follows: $THR_{high}$=if the second sale frequency is within a first range of the first sale frequency, $THR_{in}$=if the second sale frequency is within a second range of the first sale frequency but not within the first range, $THR_{low}$=if the second sale frequency exceeds the first sale frequency by an upper limit, and $THR_{out}$=if the second sale frequency falls below the first sale frequency by a lower limit. In these embodiments, based on the difference between the second sale frequency and first sale frequency, an availability classification can be selected based on the defined thresholds for each corresponding classification.

In some embodiments, the type comparison between the first and second sale frequencies used to estimate product availability can be selected using one or more machine learning algorithms (e.g., supervised or unsupervised). For example, a first comparison between the second sale frequency and first sale frequency can be selected by a supervised machine learning algorithm. Feedback can be received regarding the accuracy of the estimation using the first comparison. The feedback can be indicated by a user (e.g., the user can indicate whether or not the product was in stock, and the amount of stock, etc.) or based on an actual inventory count (e.g., as determined by a separate inventory management pipeline). The feedback can then be used to determine whether to adjust the type of comparison used to estimate availability. For example, if positive reinforcement is received indicating that the first comparison is accurate, then the first comparison may be maintained (e.g., continue to be used). In contrast, if negative reinforcement is received indicating that the first comparison is inaccurate, then a different type of comparison may be implemented (e.g., one or more thresholds can be adjusted, different thresholds can be used, etc.).

Machine learning algorithms can include but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Though reference is made to various methods of comparing sale frequencies and estimating product availability, the examples are not intended to be limiting. Any suitable comparison can be used to determine any suitable product availability estimation.

The estimated availability is then presented to a user. This is illustrated at operation 225. In embodiments, the estimated availability can be presented to the user in the same manner the user inquired availability of the product. For example, if the user requested availability on a mobile application, then the estimated availability can be provided to the user through the mobile application. However, the estimated availability can be communicated to the user in any suitable manner (e.g., using a short message service (SMS) notification, a push notification, and in-app notification, etc.).

In embodiments, an actual inventory count (e.g., as determined by a different inventory management pipeline) can be transmitted to the user along with the estimated availability determined at operation 220. For example, a notification indicating "We predict the item is out of stock, however, the inventory system indicates there are still 5 items in stock" can be transmitted to the user. In this example, the inventory system may be a different pipeline configured to identify an actual inventory count (e.g., by keeping a count of SKU's still in stock). However, as discussed above, this system may not be accurate based on unaccounted recent purchases (e.g., due to batch updates within the system). Thus, it may be beneficial for the user to receive the estimated availability determined at operation 220 as well as an actual projected inventory count as determined by a separate inventory management pipeline.

The aforementioned operations can be completed in any order and are not limited to those described. Additionally, some, all, or none of the aforementioned operations can be completed, while still remaining within the spirit and scope of the present disclosure. For example, in embodiments, operation 210 may not be completed. Rather, the availability estimates of products can be updated without user requests. The availability estimates can then be displayed for users (e.g., on a mobile application or web page) or transmitted in response to user requests.

Figure 3:
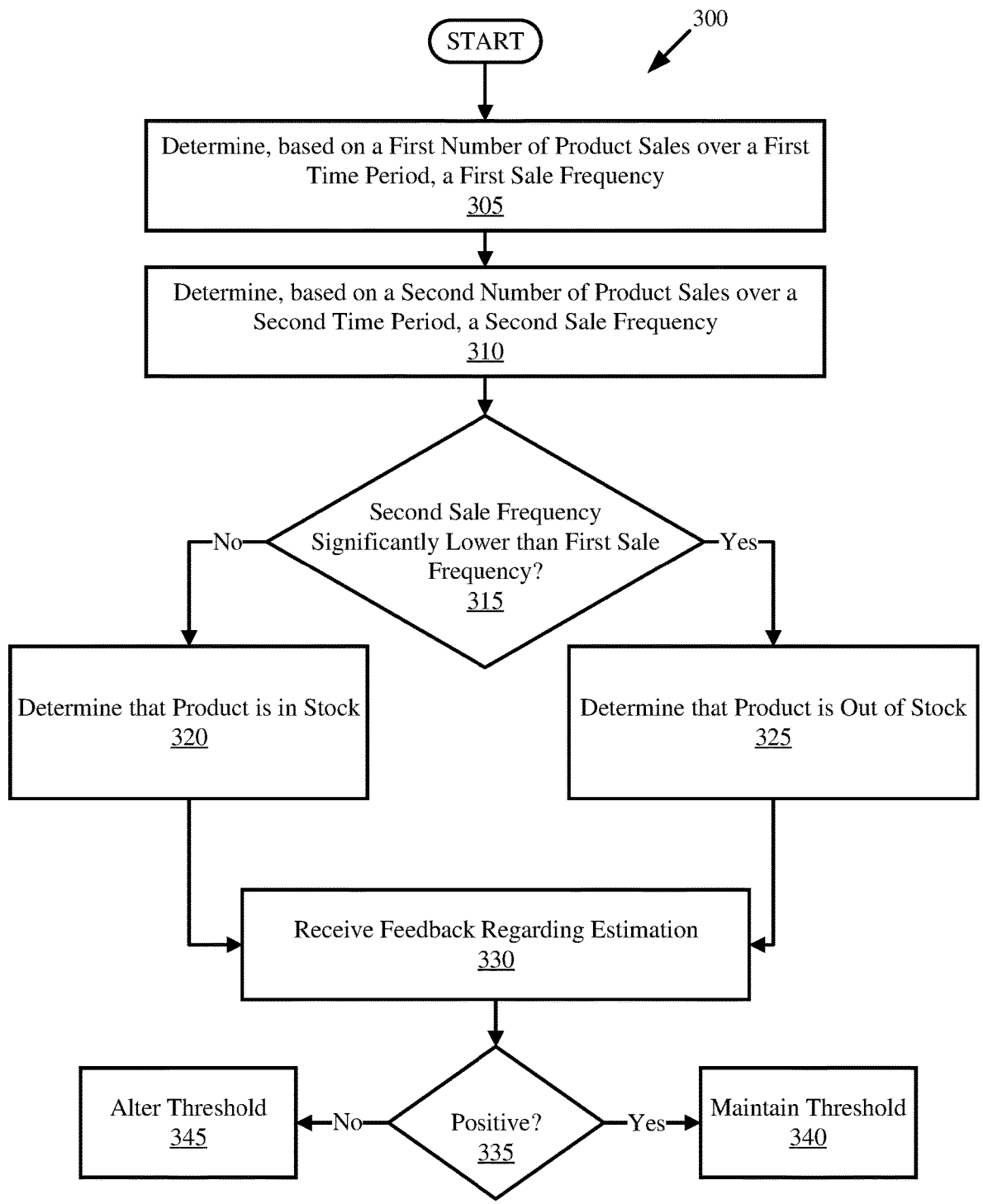
FIG. 3 is a flow-diagram illustrating an example method for estimating product availability and adjusting the manner in which product availability is estimated based on feedback, in accordance with embodiments of the present disclosure.

Referring now to FIG. 3, shown is an example method 300 for estimating product availability and adjusting a comparison used to estimate product availability, in accordance with embodiments of the present disclosure. One or more operations of method 300 can be completed by one or more computing devices (e.g., devices 105 and server 135 of FIG. 3).

Method 300 initiates at operation 305, where a first sale frequency can be determined based on a first number of product sales over a first time period. Operation 305 can be completed the same as, or substantially similar to, operation 205 of FIG. 2. For example, sales of a particular product can be tracked using SKU's (e.g., based on barcode scans) over a first time period (e.g., 1 hour). The sale frequency can be calculated as the number of sales over the first time period.

A second sale frequency can then be determined based on a second number of product sales over a second time period. This is illustrated at operation 310. Operation 310 can be completed the same as, or substantially similar, to operation 215 of FIG. 2. For example, sales of the product can be tracked using SKU's over a second time period. The second sale frequency can then be calculated as the number of sales over the second time period.

A determination is then made whether the second sale frequency is significantly lower than the first sale frequency.

This is illustrated at operation 315. In embodiments, determining whether the second sale frequency is significantly lower than the first sale frequency can be completed using a threshold. That is, if the second sale frequency falls below the first sale frequency by a threshold amount, a determination can be made that the second sale frequency is significantly lower than the first sale frequency.

If a determination is made that the second sale frequency is significantly lower than the first sale frequency, then a determination is made that the product is out of stock. This is illustrated at operation 325. If a determination is made that the second sale frequency is not significantly lower than the first sale frequency, then a determination is made that the product is still in stock. This is illustrated at operation 320.

After the availability estimates at operations 320 and 325, feedback is received regarding the availability estimation. This is illustrated at operation 330. In embodiments, the feedback can include positive feedback indicating that the availability estimate is accurate or negative feedback indicating that the availability estimate is inaccurate.

A determination is then made whether positive or negative feedback was received. This is illustrated at operation 335. If positive feedback indicating that the availability estimate is accurate is received, then the threshold used to determine whether the second sale frequency is significantly lower than the first sale frequency is maintained. This is illustrated at operation 340. If negative feedback indicating that the availability estimate is inaccurate is received, then the threshold used to determine whether the second sale frequency is significantly lower than the first sale frequency is altered. This is illustrated at operation 345. In embodiments, based on the feedback, a machine learning algorithm can be configured to select a new threshold such that more accurate availability estimations can be predicted in the future.

Figure 4:
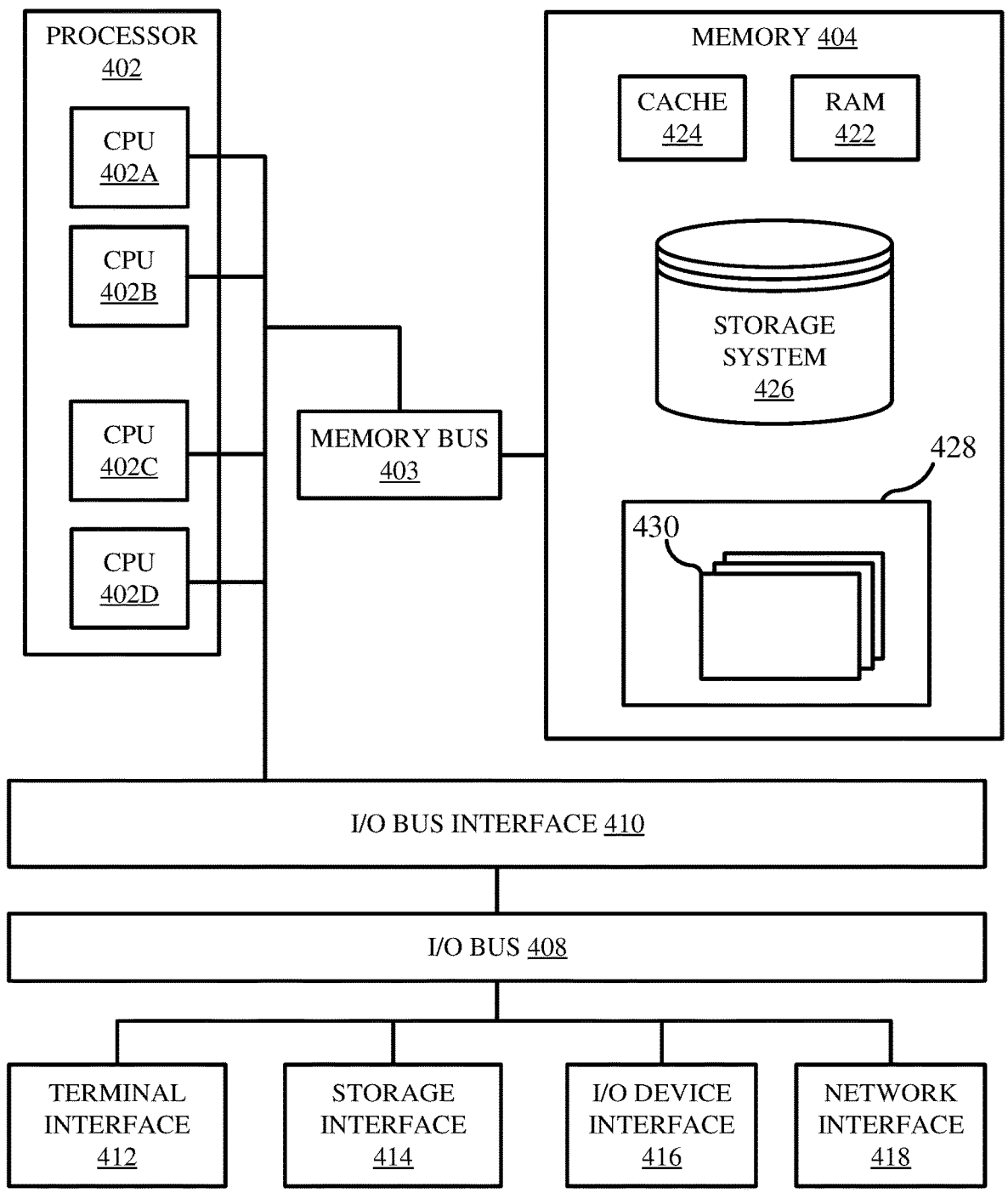
FIG. 4 is a high-level block diagram illustrating an example computer system that can be used in implementing one or more of the methods, tools, modules, and any related functions described herein, in accordance with embodiments of the present disclosure.

Referring now to FIG. 4, shown is a high-level block diagram of an example computer system 401 that may possibly be utilized in various devices discussed herein (e.g., devices 105 and server 135) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402 (also referred to as processors herein), a memory 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

Memory 404 may include computer system readable media in the form of volatile memory, such as random-access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
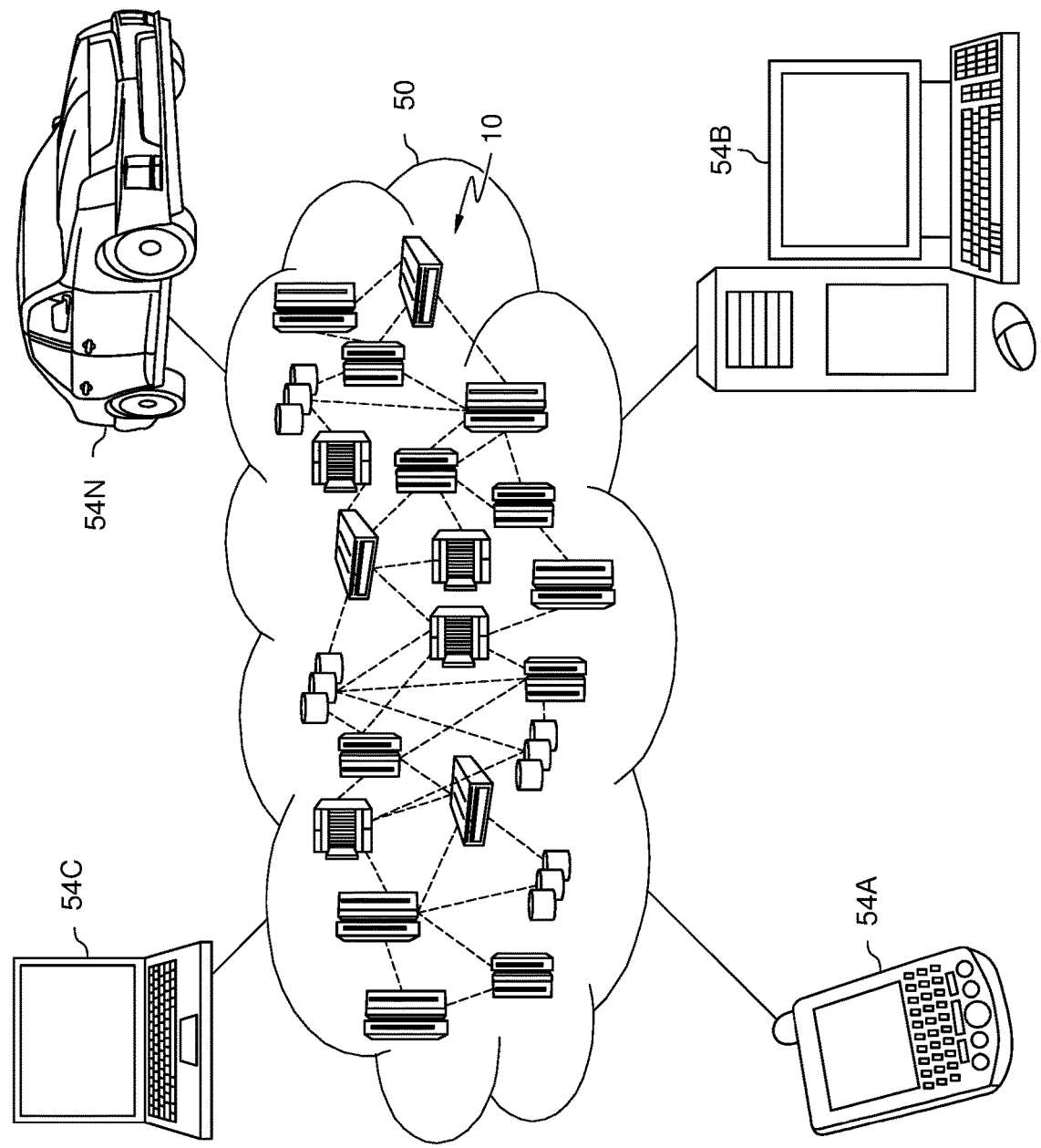
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B (e.g., server 135), laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
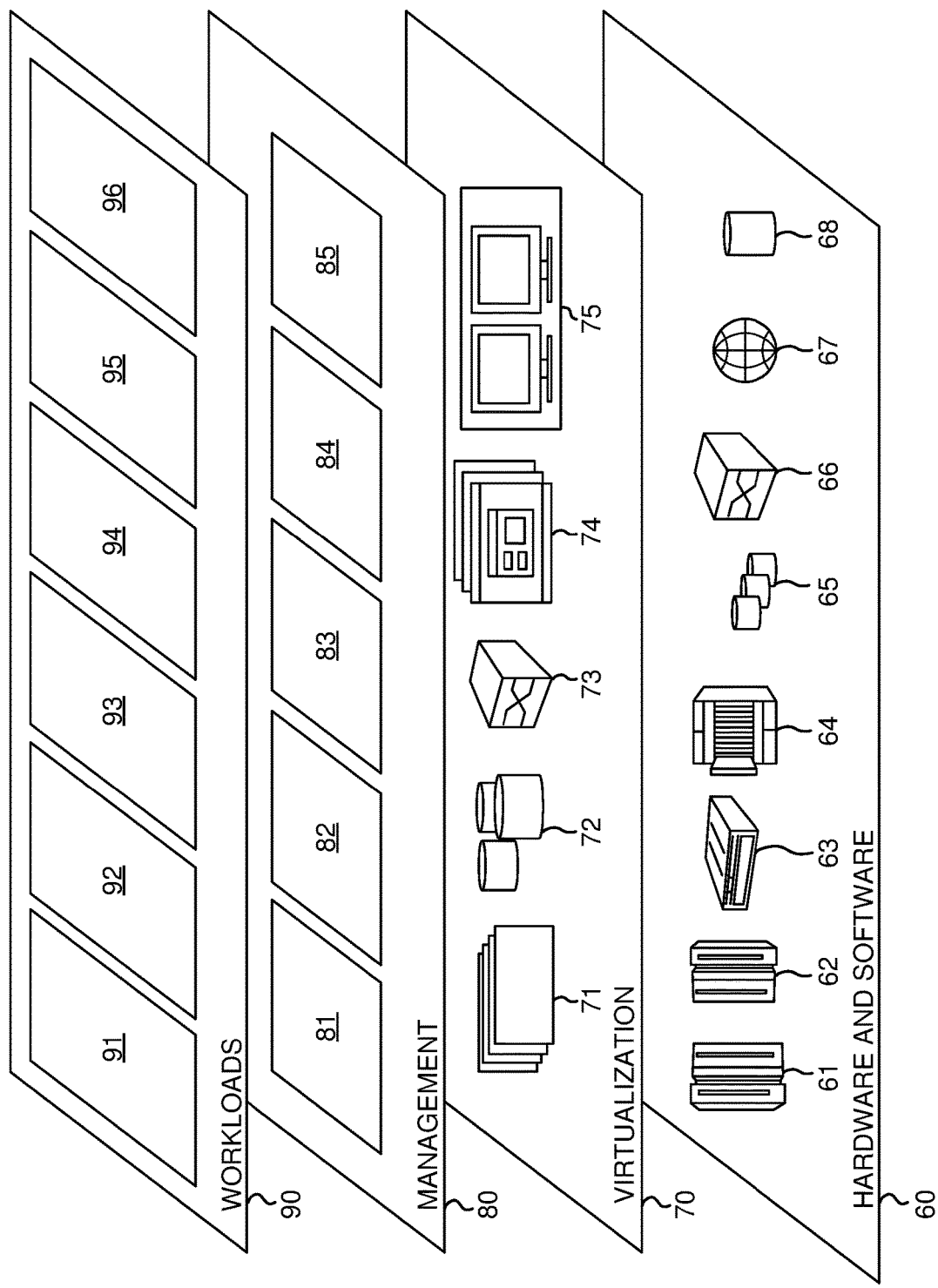
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and inventory estimation 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   determining, based on a first number of product sales of a first product over a first time period, a first sale frequency;
   determining, based on a second number of product sales of the first product over a second time period, a second sale frequency;
   generating a set of availability classifications based on comparisons between the second sale frequency and the first sale frequency, wherein the set of availability classifications include a high stock estimated availability when the second sale frequency is within a first range of the first sale frequency, an in stock estimated availability when the second sale frequency is within a second range of the first sale frequency but not within the first range of the first sale frequency, a low stock estimated availability when the second sale frequency exceeds the first sale frequency by an upper limit, and an out of stock estimated availability when the second sale frequency falls below the first sale frequency by a lower limit;
   comparing the first and second sale frequencies to estimate availability of the first product;
   determining that the second sale frequency is within the second range of the first sale frequency but not the first range of the first sale frequency;
   presenting the in stock estimated availability classification on a graphical user interface of a user device based on the second sale frequency being within the second range of the first sale frequency but not the first range of the first sale frequency;
   receiving, on the graphical user interface, negative feedback from the user indicating that the first product is out of stock;
   inputting the negative feedback into a machine learning algorithm configured to modify comparisons between the second and first sale frequencies used to determine estimated availability; and modifying, by the machine learning algorithm and based on the negative feedback input into the machine learning algorithm, the second range;

determining, based on a third number of product sales over a third time period, a third sale frequency;

comparing the third and first sale frequencies to estimate availability of the first product using the set of availability classifications; and presenting the in stock estimated availability classification on the graphical user interface of the user device based on the third sale frequency being within the modified second range of the first sale frequency but not the first range of the first sale frequency.

2. The method of claim 1, wherein the first number of product sales and the second number of product sales are determined based on stock keeping unit (SKU) scans.

3. The method of claim 1, wherein the second sale frequency is determined in response to a request for the estimated availability by the user on the graphical user interface.

4. A system comprising:
a memory storing program instructions; and
a processor, wherein the processor is configured to execute the program instructions to perform a method comprising:

determining, based on a first number of product sales of a first product over a first time period, a first sale frequency;

determining, based on a second number of product sales of the first product over a second time period, a second sale frequency;

generating a set of availability classifications based on comparisons between the second sale frequency and the first sale frequency, wherein the set of availability classifications include a high stock estimated availability when the second sale frequency is within a first range of the first sale frequency, an in stock estimated availability when the second sale frequency is within a second range of the first sale frequency but not within the first range of the first sale frequency, a low stock estimated availability when the second sale frequency exceeds the first sale frequency by an upper limit, and an out of stock estimated availability when the second sale frequency falls below the first sale frequency by a lower limit;

comparing the first and second sale frequencies to estimate availability of the first product;

determining that the second sale frequency is within the second range of the first sale frequency but not the first range of the first sale frequency;

presenting the in stock estimated availability classification on a graphical user interface of a user device based on the second sale frequency being within the second range of the first sale frequency but not the first range of the first sale frequency;

receiving, on the graphical user interface, negative feedback from the user indicating that the first product is out of stock;

inputting the negative feedback into a machine learning algorithm configured to modify comparisons between the second and first sale frequencies used to determine estimated availability; and modifying, by the machine learning algorithm and based on the negative feedback input into the machine learning algorithm, the second range;

determining, based on a third number of product sales over a third time period, a third sale frequency;

comparing the third and first sale frequencies to estimate availability of the first product using the set of availability classifications; and presenting the in stock estimated availability classification on the graphical user interface of the user device based on the third sale frequency being within the modified second range of the first sale frequency but not the first range of the first sale frequency.

5. The system of claim 4, wherein the first number of product sales and the second number of product sales are determined based on stock keeping unit (SKU) scans.

6. The system of claim 4, wherein the second sale frequency is determined in response to a request for the estimated availability by the user.

7. A computer program product comprising a computer readable storage medium having program instructions embodied therewith, the program instructions executable by a processor to cause the processor to perform a method comprising:

determining, based on a first number of product sales of a first product over a first time period, a first sale frequency;

determining, based on a second number of product sales of the first product over a second time period, a second sale frequency;

generating a set of availability classifications based on comparisons between the second sale frequency and the first sale frequency, wherein the set of availability classifications include a high stock estimated availability when the second sale frequency is within a first range of the first sale frequency, an in stock estimated availability when the second sale frequency is within a second range of the first sale frequency but not within the first range of the first sale frequency, a low stock estimated availability when the second sale frequency exceeds the first sale frequency by an upper limit, and an out of stock estimated availability when the second sale frequency falls below the first sale frequency by a lower limit;

comparing the first and second sale frequencies to estimate availability of the first product;

determining that the second sale frequency is within the second range of the first sale frequency but not the first range of the first sale frequency;

presenting the in stock estimated availability classification on a graphical user interface of a user device based on the second sale frequency being within the second range of the first sale frequency but not the first range of the first sale frequency;

receiving, on the graphical user interface, negative feedback from the user indicating that the first product is out of stock;

inputting the negative feedback into a machine learning algorithm configured to modify comparisons between the second and first sale frequencies used to determine estimated availability; and modifying, by the machine learning algorithm and based on the negative feedback input into the machine learning algorithm, the second range;

determining, based on a third number of product sales over a third time period, a third sale frequency;

comparing the third and first sale frequencies to estimate availability of the first product using the set of availability classifications; and presenting the in stock estimated availability classification on the graphical user interface of the user device based on the third sale frequency being within the modified second range of the first sale frequency but not the first range of the first sale frequency.

8. The computer program product of claim 7, wherein the first number of product sales and the second number of product sales are determined based on stock keeping unit (SKU) scans.

9. The computer program product of claim 7, wherein the second sale frequency is determined in response to a request for the estimated availability by the user.

* * * * *